United States Patent [19]

Osuna-Diaz

[11] Patent Number: 5,785,915
[45] Date of Patent: Jul. 28, 1998

[54] INJECTION MOLDING WITH ANNULAR GATE AND SLEEVE SHUTOFF VALVE

[76] Inventor: Jesuś M. Osuna-Diaz, 908 Ravine Terrace Ct., Rochester Hills, Mich. 48307

[21] Appl. No.: 713,661

[22] Filed: Sep. 13, 1996

[51] Int. Cl.⁶ ............................................. B29C 45/23
[52] U.S. Cl. .................. 264/328.9; 425/549; 425/562; 425/566
[58] Field of Search ............................. 425/562, 563, 425/564, 565, 566, 549; 264/328.9

[56] References Cited

U.S. PATENT DOCUMENTS

| 4,394,117 | 7/1983 | Taylor | 425/564 |
| 4,955,804 | 9/1990 | Martell et al. | 425/549 |
| 5,151,278 | 9/1992 | Baxi et al. | 425/564 |

*Primary Examiner*—Tim Heitbrink
*Attorney, Agent, or Firm*—John R. Benefiel

[57] ABSTRACT

An injection nozzle has an annular gate directing a flow of plastic melt into an annular opening in a mold cavity. A valve sleeve is shifted over the gate to control outflow of plastic melt.

11 Claims, 5 Drawing Sheets

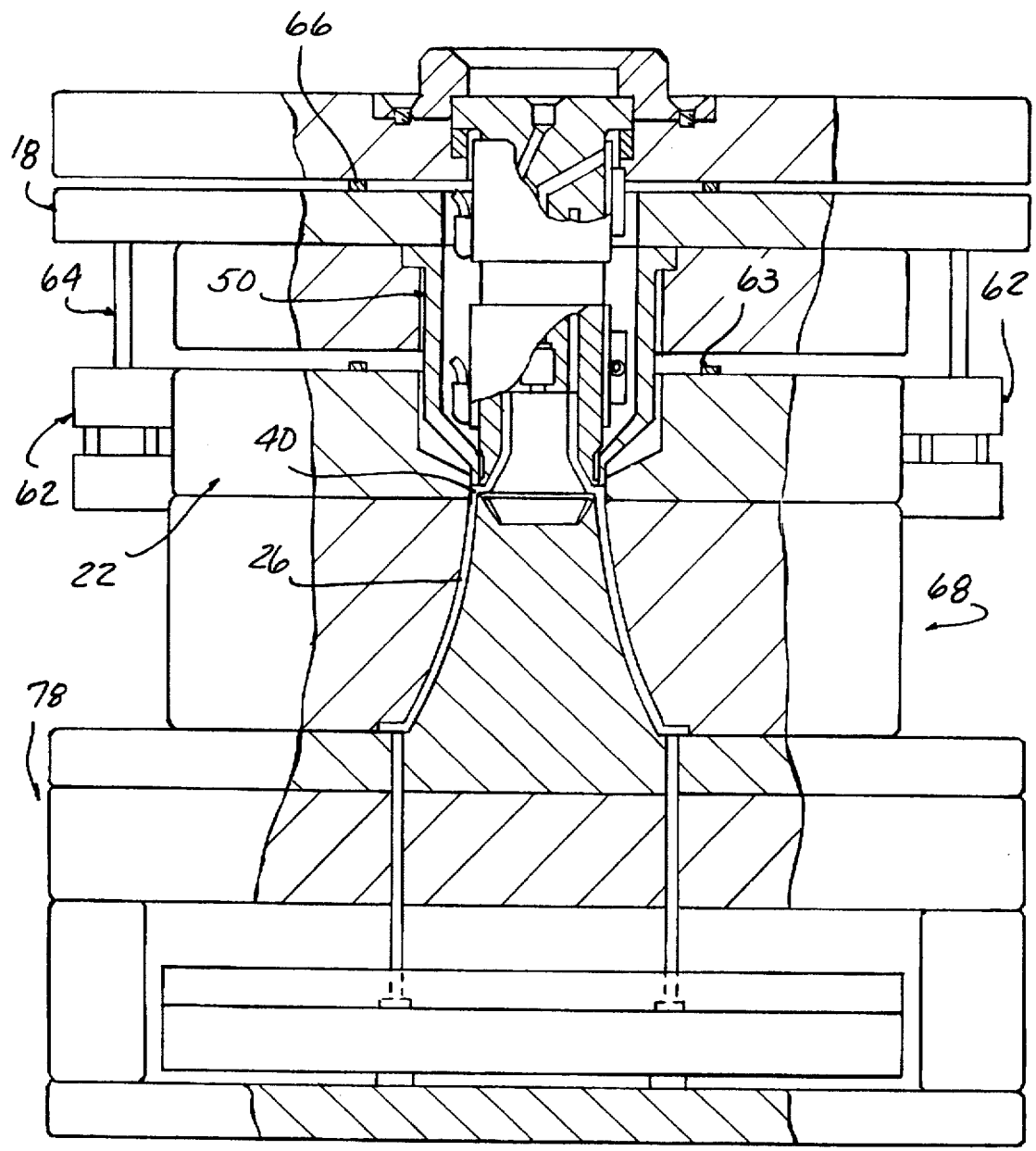
FIG·3

INJECTION MOLDING WITH ANNULAR GATE AND SLEEVE SHUTOFF VALVE

BACKGROUND OF THE INVENTION

Injection molding is a process which is in very widespread use in manufacturing a variety of parts. Often a valve pin is used to close the mold gate through which molten plastic passes from the injector nozzle into a mold cavity.

Difficulties have been encountered in molding annular parts having an open upper end aligned with the injector nozzle.

One approach is to inject plastic into an upper cavity which forms a web across the top of the part when the plastic cools. This web must be machined out, necessitating an extra operation.

In addition, the volume of plastic material which forms this web is wasted and when removed requires storage and handling in being disposed of.

Another approach has been to inject plastic material into the cavity through an annular array of gates, the molten streams of plastic from the respective parts melding within the mold cavity. However, this prevents good blending of the plastic injected into the mold cavity.

In addition, visible lines or streaks are formed between the molded regions, objectional in parts which must have an excellent appearance.

Accordingly, it is the object of the present invention to provide an injection molding nozzle having a gating valve arrangement allowing producing of annular parts without necessitating the formation of webs which must be removed, or producing visible lines or streaks in the molded part.

SUMMARY OF THE INVENTION

This and other objects which will be understood upon a reading of the following specification and claims are accomplished by an injector nozzle body bore having a nozzle insert installed therein to establish an annular passage receiving molten plastic.

The bore and insert are flared outwardly to direct the plastic into a radial clearance space between the nozzle body and the inside diameter of a surrounding plate, the clearance space aligned with an annular mold cavity for the part to be molded.

An axially extending gate is formed by a space between an end face of the nozzle body and an opposing radial flange formed on the nozzle insert.

A valve sleeve surrounds the nozzle body and has a valve end movable into the radial space to close off the gate after each injection.

The valve sleeve may be mounted to plates movable with an arrangement of actuator cylinders to move the valve sleeve into and out of the radial space.

DESCRIPTION OF THE DRAWINGS

FIG. 3 is a sectional view of an entire injection molding apparatus incorporating the injector nozzle according to the present invention in the condition when plastic is being injected into a mold cavity.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
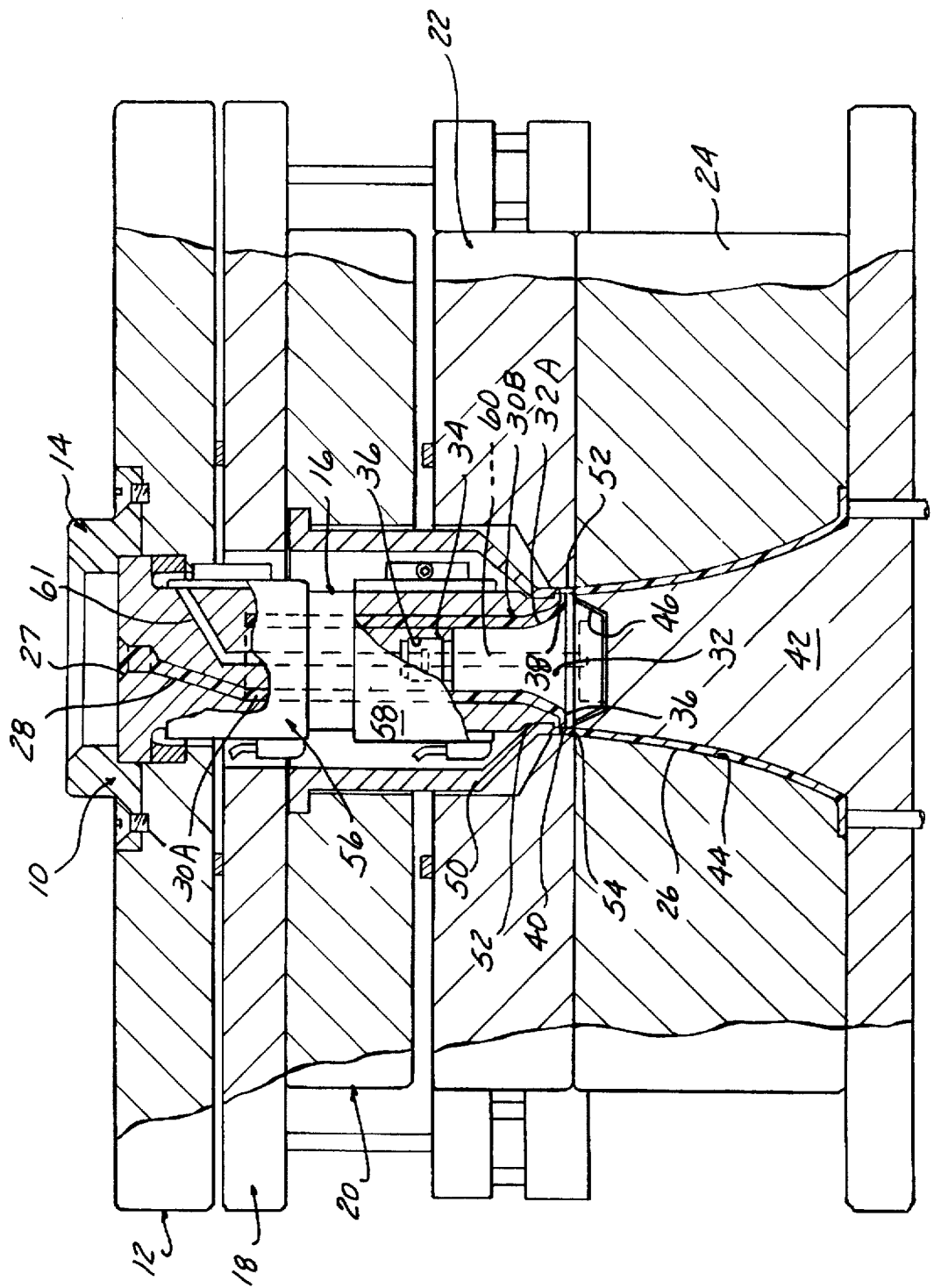
FIG. 1 is a partially sectional view of an injector nozzle according to the present invention assembled into other components of an injection molding apparatus, also shown in section.
Figure 1A:
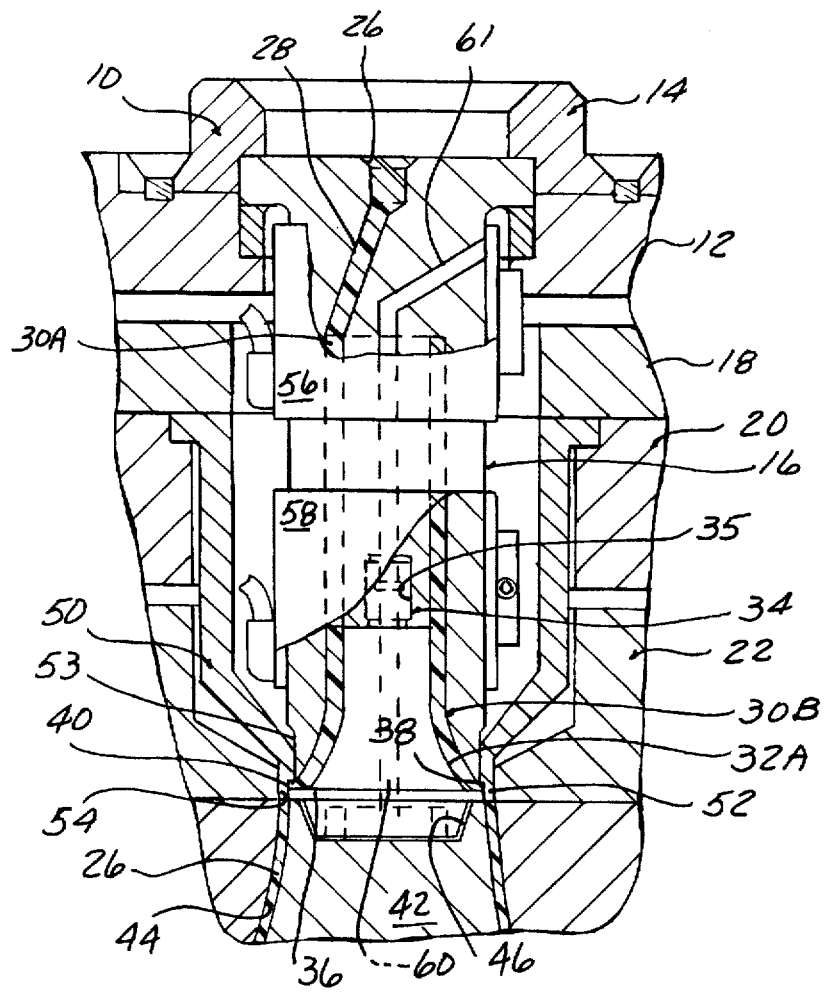
FIG. 1A is a fragmentary sectional view of the injection nozzle shown in FIG. 1, with the bushing sleeve advanced to close the annular nozzle gate.
Figure 2:
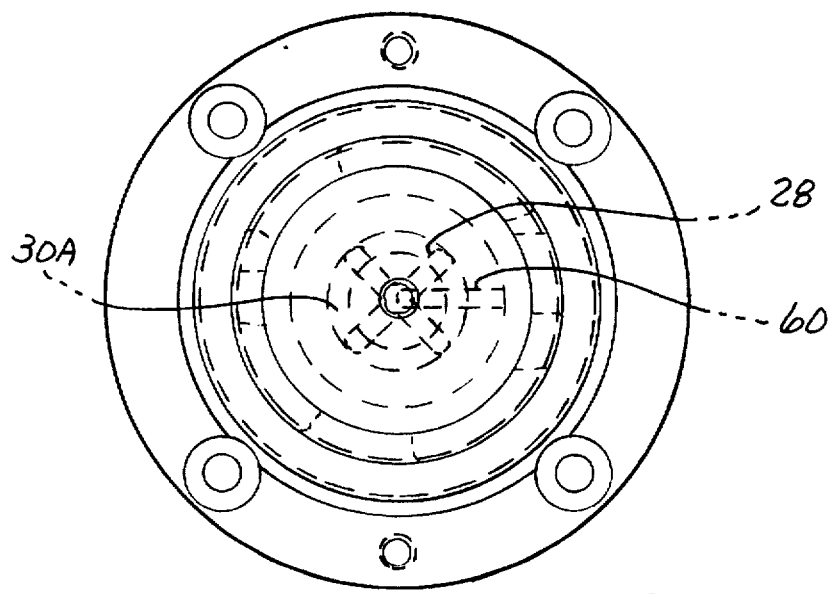
FIG. 2 is an end view of the injector nozzle shown in FIG. 1.
Figure 1B:
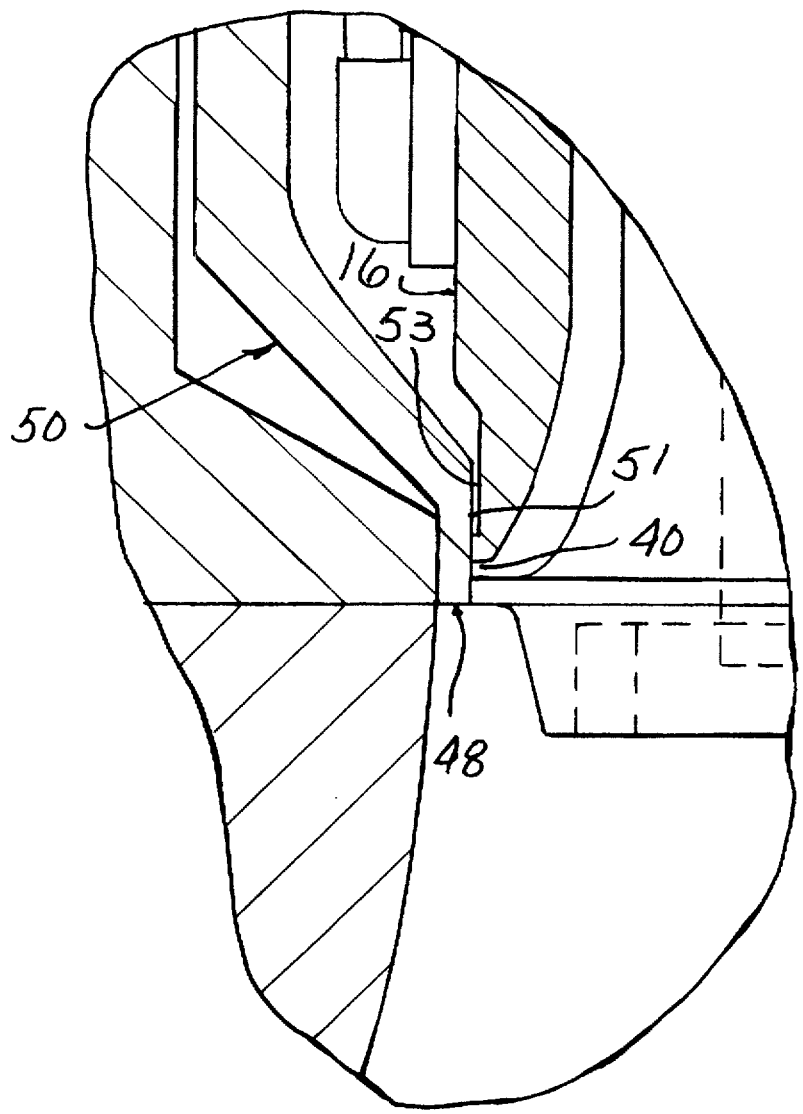
FIG. 1B is an enlarged fragmentary sectional view of the of the injector nozzle, mold gate, and valve sleeve in the position shown in FIG. 1A.

Referring to the FIGS. 1A and 1B, an injection nozzle 10 according to the present invention is shown held at its upper end in a counterbore in a clamp plate 12 by an injector locating ring 14 mounted in another counterbore on the upper surface with machine screws as shown.

The injection nozzle 10 includes a generally cylindrical nozzle body 16 extending down within a central bore in each of a series of plates, i.e., ejector retainer plate 18, ejector plate 20, and a so-called "A" plate 22.

A mold block 24 is formed with an annular mold cavity 26 aligned with the nozzle body 16.

An entry port 27 at the upper end of nozzle body 16 is adapted to receive melted plastic from an injection machine (not shown) in the conventional manner.

A series of inclined supply passages 28 diverge from the entry port 26 to enter an upper annular supply passage 30A, which extends axially to the lower region of the nozzle body 16. A lower supply section 30B is outwardly flared to extend to the outer perimeter of the nozzle body 16.

The lower supply section 30B is defined in part by the outer surface of a nozzle insert 32 which has a threaded plug end 34 received in a threaded counterbore 35 in the nozzle body 16.

The nozzle insert 32 has an outwardly tapering section 32A corresponding to the outwardly flared supply section 30B. A radial flange 36 is provided just below the tapering section 32A, which extends radially out opposite a lower end face 38 on the nozzle body 16, but spaced axially below to define therebetween a radially extending annular gate 40.

The flange 36 abuts the upper end of a mold core 42 mounted within a cavity 44 in the mold block 24 to define the annular cavity 26 aligned with the annular gate 40.

The top of the mold core 42 has a recess 46 which accommodates a lower end of the nozzle insert 32.

Outflow through the annular gate 40 is controlled by the position of a lower end 48 of a valve sleeve 50 mounted concentrically around the lower end of the injector nozzle 10. The valve sleeve 50 is axially movable so that the lower end 48 can be slid down into space 52 past the gate 40 to cover the gate 40. The lower end 48 is slidable on the lower end of the valve body 16 and within a bore 54 in the "A" plate 3. A slight undercut 53 is provided adjacent the lower end of the valve body 16 to insure a tight sealing fit with the inside diameter 51 of the sleeve 50 while allowing free sliding movement (FIG. 1B).

Thus, any flash on the end of the molded part is avoided, as the excess material in space 52 is moved out as the valve sleeve 50 descends.

A pair of band heaters 56, 58 encircle the nozzle body 16, and an internal TCH type heater 60 is mounted in a cavity within the nozzle insert 32 to insure good flow of plastic during injection.

A drilled passage 61 allows an electrical power connection (not shown) to the internal heater 60.

Figure 4:
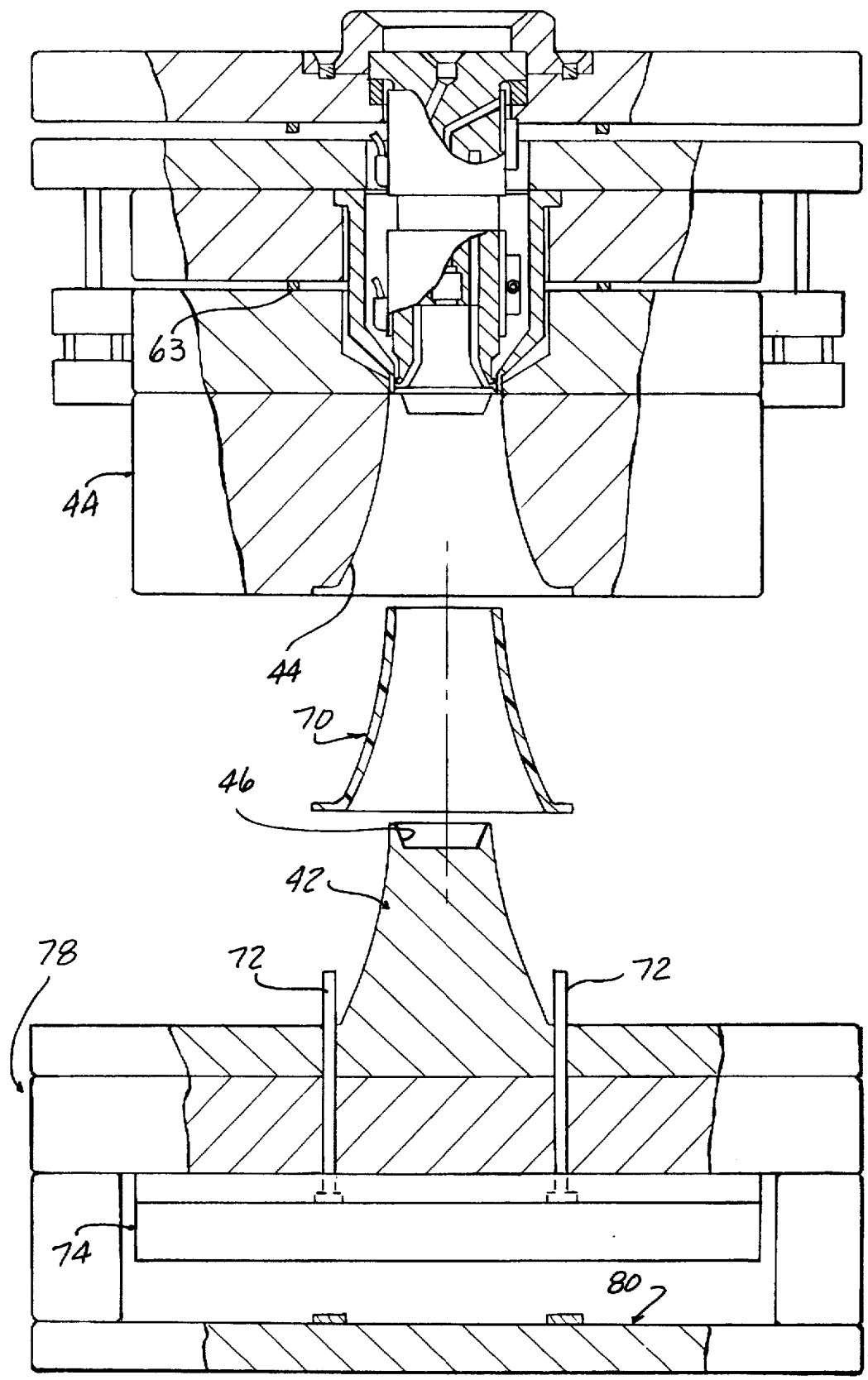
FIG. 4 is a sectional view of the injection molding apparatus shown in FIG. 3 in the condition in which a molded part has been formed and ejected from the mold cavity.

FIGS. 3 and 4 show a pair of diametrically opposite hydraulic actuators 62 mounted to plate 33. Operating rods 64 are threaded into the underside of retainer plate 18. When the actuators 62 are extended as shown in FIG. 3, retainer plate 18 is raised to abut against stop ring 66. In this position, the valve sleeve 50 is elevated to open the gate 40 and allow plastic to flow into the mold cavity 26

In FIG. 4, the molding process is completed and the actuators 62 are retracted, moving plate 20 down against stop ring 63 which causes the valve sleeve 50 to be positively moved down and close off the gate 40.

The mold assembly 68 is separated, allowing ejection of the part 70 by advance of the ejection pins 72 on a holder plate 74 in a cavity 76 of a lower mold subassembly 78. A suitable actuator (not shown) is provided for this purpose.

Accordingly, the part 70 is formed without any excess flash or web which must be removed and material wasted.

The plastic melt is well mixed in the annular passage 30 and flows in an uninterrupted stream through the annular gate 40, so that no visible striations or visible flaws result. The part 70 is therefor of the highest quality.

At the same time, the apparatus is simple and reliable in operation.

I claim:

1. A method of injecting plastic melt through a nozzle body into an annular opening of a mold cavity, comprising the steps of:

directing plastic melt into an annular passage in said valve body which extends to a radial gate defined around the periphery of one end of said nozzle body;

aligning an annular space just outside said radial gate with said annular mold cavity opening so that said plastic melt is directed axially into said annular opening of said mold cavity;

selectively moving a sleeve through said annular space and past said radial gate to completely overlie said radial gate and prevent outflow of plastic melt therethrough after each mold cycle.

2. An injection nozzle for injecting plastic melt into an annular mold cavity, comprising:

an elongated nozzle body having opposite ends, said nozzle body formed with an entry port at one end for introduction of plastic melt under pressure;

an outwardly flared opening at the other end of said nozzle body;

a nozzle body insert concentrically disposed in said outwardly flared nozzle body opening, said insert having an outer surface tapering generally outwardly to define therebetween a radially outwardly inclined nozzle body annular passage extending to an outside diameter of said nozzle body at said other end thereof;

an internal passage interconnecting said entry port and said annular passage;

said nozzle body insert also formed with a flange portion spaced from said nozzle body one end to define a radially extending annular gate communicating with said outwardly flared annular passage;

a valve sleeve disposed over said nozzle body lower end movable axially from a retracted position away from said annular gate and an advanced position extending past said annular gate into a space beyond said annular gate so as to completely overlie said annular gate; and, actuating means for positively shifting said valve sleeve between said retracted and advanced positions.

3. The injection nozzle of claim 2 with said mold formed with an annular cavity opening, said valve sleeve concentric to said annular cavity opening.

4. The injection nozzle of claim 2 wherein said sleeve is slidably fit to said nozzle body adjacent to said other end thereof.

5. The injection nozzle of claim 2 wherein said valve sleeve is secured to a movable plate and wherein said actuating means includes a pair of power cylinders located diametrically across from each other and each having an operating rod together driving said movable plate to shift said valve sleeve between said retracted and advanced positions.

6. The injection nozzle of claim 2 wherein said internal passage includes a series of outwardly inclined passages extending from said entry port to an intermediate annular passage in turn extending to said outwardly flared opening.

7. The injection nozzle of claim 2 further including at least one band heater encircling said nozzle body, and an internal heater in said insert.

8. The injection nozzle of claim 2 wherein said nozzle body insert comprises a separate element mounted to said nozzle body within said outwardly flaring opening.

9. The injection nozzle of claim 8 wherein said insert has one end threaded into a bore extending axially into said flared opening.

10. The injection nozzle of claim 3 wherein said insert has an end which projects into a recess in said mold.

11. The injection nozzle of claim 2 wherein said insert outer surface is outwardly tapered in close correspondence to the flaring of said opening to define a generally constant depth annular passage.

* * * * *